(12) United States Patent
Buehler et al.

(10) Patent No.: US 11,562,037 B2
(45) Date of Patent: Jan. 24, 2023

(54) CRAWLABILITY OF SINGLE PAGE APPLICATIONS

(71) Applicant: INTERNATIONAL BUSINESS MACHINES CORPORATION, Armonk, NY (US)

(72) Inventors: Dieter Buehler, Tuebingen (DE); Carsten Leue, Sindelfingen (DE); Uwe Karl Hansmann, Tuebingen (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/009,808

(22) Filed: Sep. 2, 2020

(65) Prior Publication Data

US 2021/0081464 A1  Mar. 18, 2021

(30) Foreign Application Priority Data

Sep. 18, 2019  (EP) ..................... 19198006

(51) Int. Cl.
*G06F 16/951* (2019.01)
*H04L 67/02* (2022.01)
*G06F 16/958* (2019.01)

(52) U.S. Cl.
CPC .......... *G06F 16/951* (2019.01); *G06F 16/958* (2019.01); *H04L 67/02* (2013.01)

(58) Field of Classification Search
CPC .. G06F 16/951; G06F 16/9574; G06F 16/958; G06F 16/9577; G06F 40/14; G06F 16/986; G06F 16/957; H04L 67/02; H04L 67/42
USPC ......................................................... 707/709
See application file for complete search history.

(56) References Cited

U.S. PATENT DOCUMENTS

| | | | |
|---|---|---|---|
| 2015/0278171 A1 | 10/2015 | Lefebvre | |
| 2017/0034292 A1* | 2/2017 | George | .............. H04L 67/22 |
| 2018/0013390 A1 | 1/2018 | Cohen | |
| 2018/0060446 A1 | 3/2018 | Swedlund | |
| 2018/0173390 A1 | 6/2018 | Dunne | |
| 2018/0173715 A1 | 6/2018 | Dunne | |
| 2019/0303500 A1* | 10/2019 | Mathews | .............. G06F 16/951 |

OTHER PUBLICATIONS

Fink et al., "Pro Single Page Application Development", Apress Berkely, CA, 2014, p. 1-324 (Year: 2014).*

* cited by examiner

*Primary Examiner* — Jeffrey R Swearingen
(74) *Attorney, Agent, or Firm* — Steven M. Bouknight (57) ABSTRACT

A computer-implemented method for enabling static markup crawlability for a web application dynamically updating web pages client-side may be provided. The method comprises providing a web application identifiable by a web address comprising both, a static content block and dynamic content, and generating a static HTML page and pre-rendering the static content block of the web application such that at least a portion of static content of the web application is crawlable.

18 Claims, 6 Drawing Sheets

100

102 providing a web application identifiable by a web address comprising both, a static content block and dynamic content

104 generating a static HTML page and pre-rendering the static content block of the web application such that all static content of the web application is crawlable

CRAWLABILITY OF SINGLE PAGE APPLICATIONS

BACKGROUND

Field of the Invention

The present invention relates generally to a search application for content on the World Wide Web, and more specifically, to a computer-implemented method, system, and computer program product for enabling static markup crawlability for a web application dynamically updating web pages client-side. The invention relates further to a system for enabling static markup crawlability for a web application dynamically updating web pages client-side, and a computer program product.

Related Art

In today's Internet, the ability of a website to be analyzed, i.e., crawled, by a web crawler, especially for the purpose of being indexed by a search engine, is a key aspect of successful websites. Websites that are not found by a major search engine will not be used by a larger group of people. Especially, in the area of online shops, it is instrumental that all potential customers find and get to know about a website that serves that online shop. However, web pages of online shops typically comprise dynamic content, e.g., content generated out of an order entry, a logistics, or a warehouse system.

In particular, with a single page application (SPA), which involves dynamically rendering pages on the client, it is typically hard to provide those pages upfront to a crawler in a reliable and secure way. Reliable in this context means that the crawler is actually able to index the actual content (e.g., a product description) while ignoring markup fragments required by the graphical user interface (e.g., headings, links to other sections, . . . ). Trying to pre-render the individual pages of a SPA on the server (sometimes denoted as "universal rendering") is a complex and often error-prone task. There are some client-side programming frameworks supporting such concepts. However, this may put unintended restrictions on the web developer coding the SPA.

In addition to this, using a server-side SPA pre-rendering approach may have security implications when used in a multi-tenant cloud system. This is because the universal rendering process is a complex process that in turn may need access to other services and static resources. When running this process on a cloud computing runtime environment, shielding other services from unintended process tenant access may become a severe challenge and may result in yet additional unintended restrictions to the programming model available to the SPA program.

There are several disclosures related to a computer-implemented method for enabling static markup crawlability for a web application dynamically updating web pages client-side. Document U.S. Patent Application Publication No. 2018/013390 A1 discloses an integration of web content generated by a content management system (CMS) with dynamic content generated by a content development system including an application programming interface (hereinafter API) handler of the CMS, configured to commonly take an action received from a remote computing device to a web portion.

Document U.S. Patent Application Publication No. 2018/0173715 A1 discloses methods for secure access to dynamic analytics content including receiving a request for analytics information from a user at a computing device, confirming the user's access rights, embedding access credentials with a resource link for accessing the visualization content, and supplying the resource link to the user's computing device for use in obtaining the analytics information.

A disadvantage of known solutions may continue to be the fact that traditional crawlers are not able to handle the content of dynamically generated web pages or web applications in a secure and reliable way. Thus, there is a need to overcome the drawbacks of the conventional way of providing a mixture of static and dynamic web page content to a conventional crawler system.

SUMMARY

According to one aspect of the present invention, a computer-implemented method for enabling static markup crawlability for a web application dynamically updating web pages client-side may be provided. The method may comprise providing a web application identifiable by a web address comprising both, a static content block and dynamic content, and generating a static Hypertext Markup Language (hereinafter HTML) page pre-rendering the static content block of the web application such that at least a portion of all static content of the web application is crawlable.

Also, according to one aspect of the present invention, a related system for enabling static markup crawlability for a web application dynamically updating web pages client-side may be provided. The system may comprise providing a web application identifiable by a web address comprising both, a static content block and dynamic content, and generating a static HTML page and pre-rendering the static content block of the web application such that at least a portion of—in particular all—static content of the web application is crawlable.

Furthermore, according to one aspect of the present invention, a related computer program product for enabling static markup crawlability for a web application dynamically updating web pages client-side may be provided. The computer program product may comprise providing a web application identifiable by a web address comprising both, a static content block and dynamic content, and generating a static HTML page and pre-rendering the static content block of the web application such that at least a portion of and/or all static content of the web application is crawlable The proposed computer-implemented method, system, and computer program product for enabling static markup crawlability for a web application dynamically updating web pages client-side may offer multiple advantages, technical effects, contributions and/or improvements:

The traditional disadvantages of web pages and/or web applications providing access to static content as well as to dynamic content under the same web address may be overcome. This may represent a major step forward for Internet online shops which typically work with dynamically generated web content from warehouse management systems, logistic systems, content management systems, and the like. Traditional crawlers typically have difficulties in differentiating the static content of a web page from the framework data required for the dynamically generated and provided components of, e.g., single page applications (SPA).

According to one embodiment, any crawler may be able to crawl, analyze and index the static components of an SPA because the here proposed method and related system may detect from which source the SPA is requested—either from a browser of a client system or, alternatively, from a crawler system—may behave differently. In the first case—the browser case—the SPA may be prepared and provided to the browser in a known way. In the second case—the crawler case, only the static content of the SPA may be pre-rendered server-side, to which the request to the SPA from a crawler may be addressed, such that the crawler may not determine the difference between a classical static web page and the pre-rendered static content of the SPA. In this case, also the dynamic content of the SPA may be suppressed. Thus, an execution of a bootstrap code, typically part of a SPA, may not be provided to the crawler.

Additionally, proposed embodiments may be used to display the static content of a SPA faster in a browser by sending the static content blocks to the browser and executing the bootstrap code on the server in a delayed fashion.

In the following, additional embodiments of the inventive concept—applicable to the method as well as to the related system—will be described.

According to one embodiment, the method may also comprise requesting a first static content block of the web application—i.e., loading the first static content block, triggered, e.g., by a crawler from a content storage, and pre-rendering the content of the first static content block using respective static templates on the server. The content storage may be a content management system (or similar), e.g., for managing web content, or also a flat file system. Thus, there may be no restrictions regarding the source of the static, as well as the dynamic content of the web application.

According to one embodiment, the method may also comprise: upon determining that more static content blocks are present in the web application, repeating a loading and the pre-rendering for at least a portion—in particular all—static content blocks in the web application. Consequently, all static content blocks of the web application may be loaded completely. On the other side, the dynamic components of the web application are not loaded at this point in time.

According to one embodiment, the method may also comprise: upon determining a browser call—in particular, a browser API call, or a request—to the web address, executing—in particular on a server system—a bootstrap code pulled in by the static HTML page. The bootstrap code may typically be JavaScript. However, there is a number of alternatives that exist which may be used instead of JavaScript. JavaScript (JS) is known for a couple of features like: creating all types of online interactive forms, registration forms, questionnaires and other forms that need to be filled by users; tracking users' actions on the site, such as scrolling, zooming, clicking buttons and so on; and accessing HTML-based components and working with them without the need of refreshing the page. Thereby, one of the key JS advantages is its full compatibility with most existing browsers.

Examples of alternatives to JavaScript comprise CoffeeScript which may be trans-compiled into JS; Dart (Google® approach for dynamic web pages, Google and all Google-based trademarks and logos are trademarks or registered trademarks of Google, Inc. and/or its affiliates); typescript (Microsoft® approach for dynamic web pages; Microsoft and all Microsoft-based trademarks and logos are trademarks or registered trademarks of Microsoft, Inc. and/or its affiliates); ClojureScript which may also be compiled into JavaScript; Opal which is an object-oriented language acting as a trans-compiler to JavaScript from Ruby; Elm, a comparably new functional language used for graphic interface development; Kaffeine which has been created as an extension of the JavaScript syntax—it is also compiled to JavaScript code.

According to an additional embodiment of the method, the bootstrap code may enable lazy loading and may start rendering of the web application. This may happen on the client-side, e.g., using a browser.

According to another advantageous embodiment, the method may also comprise generating dynamically, by the web application, a HTML document object model (DOM) relating to the static HTML page. A SPA specific template may be used, e.g., angular markup templates. In parallel, the static HTML page may become obsolete.

According to one embodiment, the method may also comprise: upon determining a call to the web address is not a browser originating call, suppressing an executing of the bootstrap code. It may be assumed that in this case the requesting entity may be a standard crawler which may not have been modified to interpret single page applications.

According to one embodiment, the method may also comprise: upon determining a browser call to the web address, sending the static HTML page, and replacing the static HTML page with the web application. This case may represent a typical process of a browser requesting static as well as dynamic content from, e.g., a single page application. In such cases—and according to a further embodiment—a plurality of dynamic content items may be part of a single page application.

According to one embodiment of the method, a plurality of static content blocks represents portions of the web application. Also, this may be a relatively normal condition for single page applications.

According to one embodiment of the method, the static content block may be pre-rendered on the server. A template may be used for the pre-rendering. Additionally, Handlebars may be used as a templating language. The Handlebar templating engine is based on the Mustache template engine but improves it in several important ways. With Handlebars one may, e.g., separate the generation of HTML from the rest of the JavaScript and write cleaner code.

Furthermore, embodiments may take the form of a related computer program product, accessible from a computer-usable or computer-readable medium providing program code for use, by, or in connection, with a computer or any instruction execution system. For the purpose of this description, a computer-usable or computer-readable medium may be any apparatus that may store, communicate, propagate or transport the program for use, by, or in connection, with the instruction execution system, apparatus, or device.

BRIEF DESCRIPTION OF THE SEVERAL VIEWS OF THE DRAWINGS

It should be noted that embodiments of the invention are described with reference to different subject-matters. In particular, some embodiments are described with reference to method type claims, whereas other embodiments are described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be disclosed within this document.

The aspects defined above, and further aspects of the present invention, are apparent from the examples of embodiments to be described hereinafter and are explained with reference to the examples of embodiments, but to which the invention is not limited.

Preferred embodiments of the invention will be described, by way of example only, and with reference to the following drawings.

DETAILED DESCRIPTION

In the context of this description, the following conventions, terms and/or expressions may be used:

The term 'static markup crawlability' may denote the characteristic of a web page, comprising static content as well as dynamically generated content, that the static markup components can be made available to a crawler for indexing by a search engine.

The term 'web application dynamically updating web pages client-side' may denote a web page comprising at least one static content block and one or more areas, in which content is regularly updated. Such web applications are known as single page applications.

The term 'web address' may denote an address code in form of a URL (universal resource locator).

The term 'static content block' may denote a portion of a web page comprising content that is not dynamically changing during the runtime/display time of a web page, unless the web page has been edited and re-published. Typically, static content may comprise text, images and the like.

The term 'dynamic content' may denote content that may be updated on a more or less regular basis and pushed out to a portion of a web page as variable content. Examples may comprise order lists, delivery dates, but also video sequences, sound files, and so on.

The term 'static HTML page' may denote a web page comprising only static content blocks.

The term 'pre-rendering' may denote a process of preparing a web page—i.e., the source and the related format—for sending it to the requesting service. In the proposed concept, this is done for static content blocks on a server.

The term 'crawlable' may denote the characteristic of a web page to be analyzed by a crawler or crawler system in order to index the content by a search engine for better and faster retrieval.

The term 'browser call' may denote a request to a web server originating from a client-side browser.

The term 'bootstrap code' may denote executable or interpretable software code activated by a static HTML page segment in order to load and render embedded dynamic content of a web page.

The term 'lazy loading' may denote a design pattern to defer an initialization of an object until a point in time at which it is needed. In the context of the proposed idea, static content components of a single page application may be loaded and rendered directly after the request for the single page application. In contrast, those components that take longer time to load—e.g., dynamic components—are loaded with a delay, rendered and made available to the browser at a slightly delayed point in time, e.g., dynamic content.

The term 'document object model' (DOM) may denote a language-independent interface that treats an extensive markup language (hereinafter XML) or HTML document as a tree structure, wherein each node is an object representing a part of the document. The parts of the document may either be static content blocks or dynamic content.

The term 'JavaScript code' may denote the well-known, high-level, interpreted scripting language that conforms to the ECMAscript specification. It is one of the core technologies besides HTML and CSS (Cascaded Style Sheet) of the World Wide Web.

In the following, a detailed description of the figures will be given. All instructions in the figures are schematic. Firstly, a block diagram of an embodiment of the inventive computer-implemented method for enabling static markup crawlability for a web application dynamically updating web pages client-side is given. Afterwards, further embodiments, as well as embodiments of the system for enabling static markup crawlability for a web application dynamically updating web pages client-side, will be described.

Figure 1:
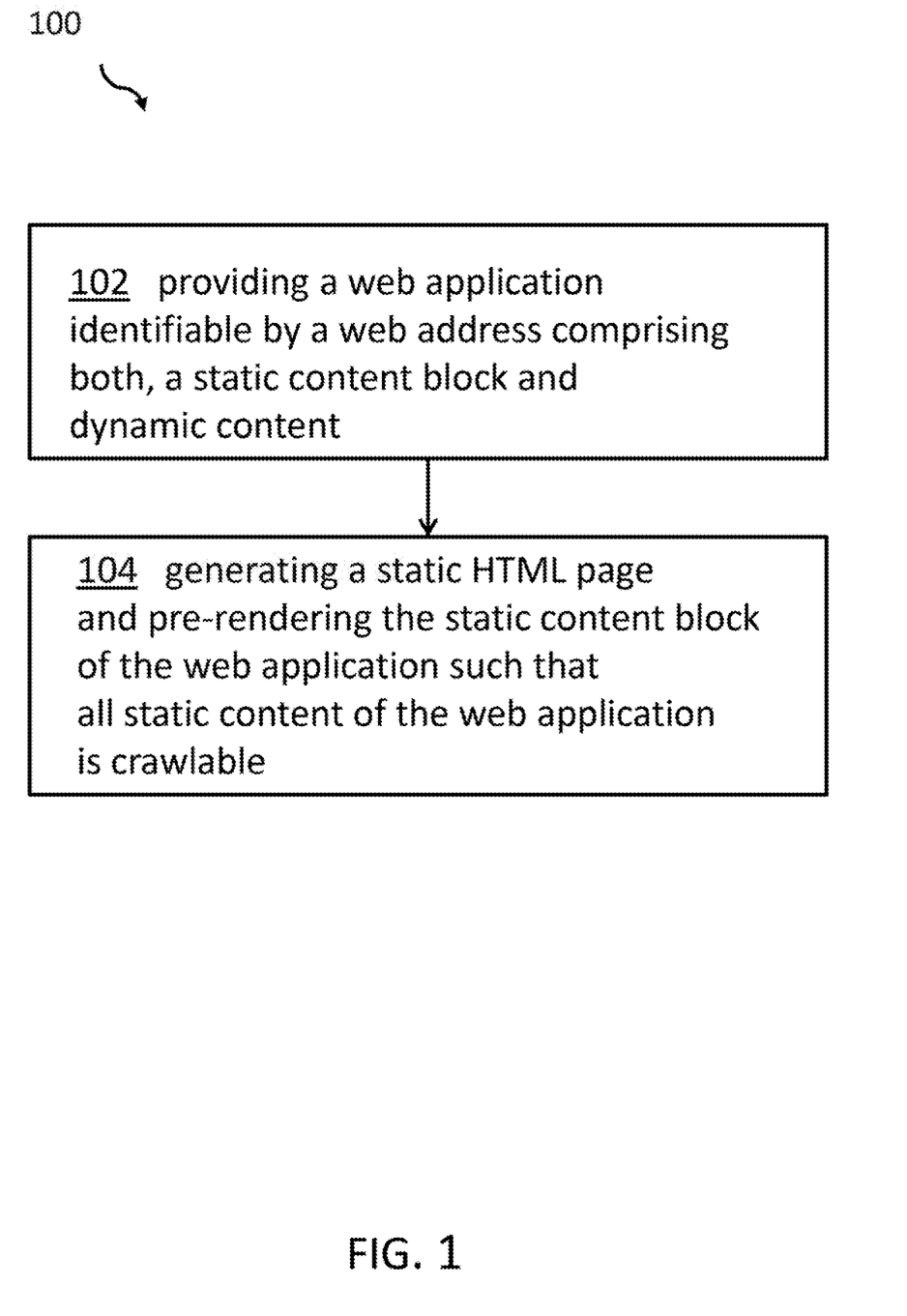
FIG. 1 shows a block diagram of an embodiment of the inventive computer-implemented method for enabling static markup crawlability for a web application dynamically updating web pages client-side.

FIG. 1 shows a block diagram of a preferred embodiment of the method 100 for enabling static markup crawlability for a web application dynamically updating web pages client-side. Such dynamically updated web applications are known as single page applications (SPA) hosted, e.g., on a (web) cloud content management system. It may be implemented as a multi-tenant cloud service. The method comprises providing, 102, a web application, identifiable by a web address—typically a URL (universal resource locator). The web application comprises both, at least one static content block and also dynamic content, i.e., output of the SPA.

Additionally, the method 100 comprises generating, 104, a static HTML page and pre-rendering the static content block of the web application such that all static content—in particular, a portion of the static content—of the web application is crawlable. Now, the page—i.e., the SPA—can be parsed and analyzed by a usual search crawler in a reliable way. No precautions are required on the crawler-side. The pre-rendering shall be executed on the server.

Figure 2:
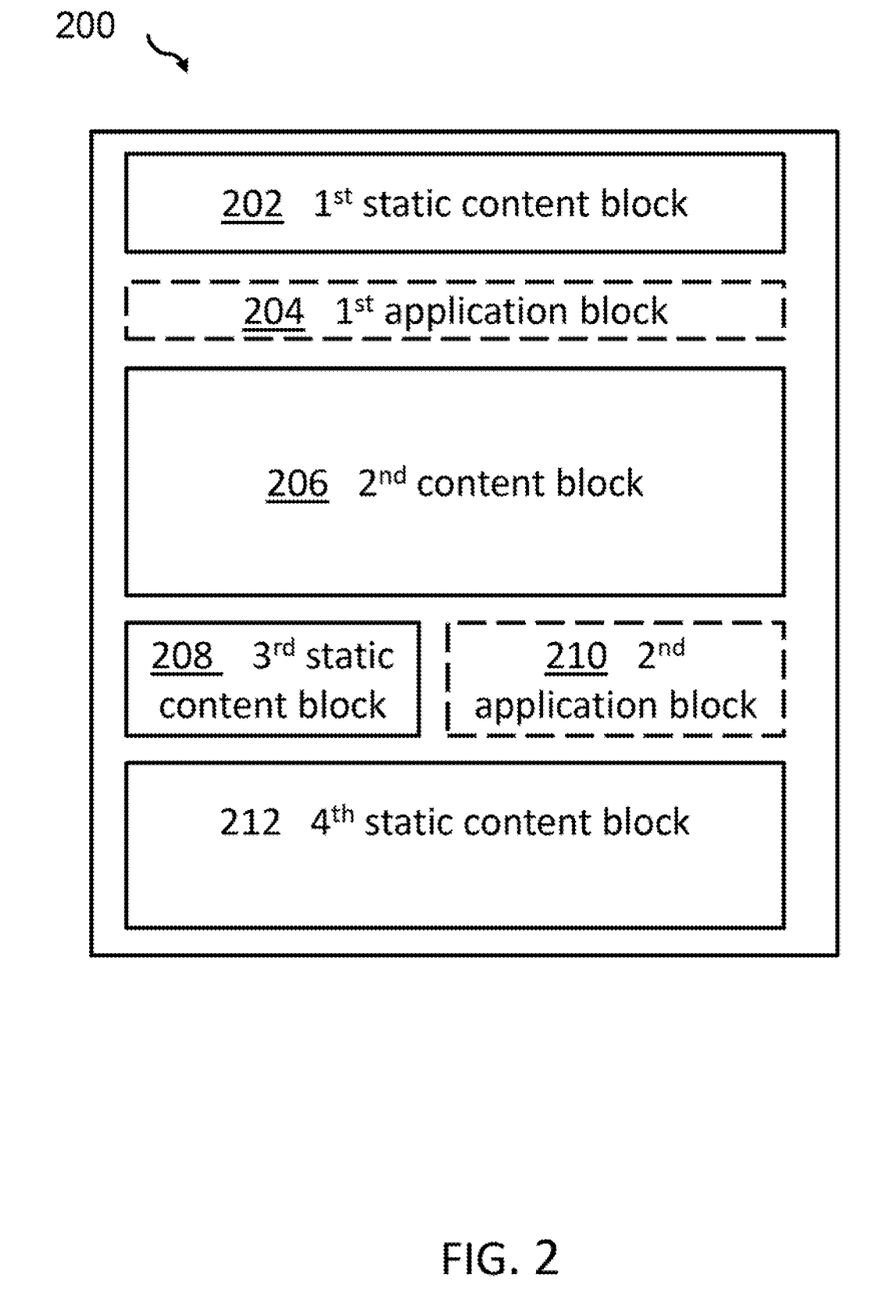
FIG. 2 shows a block diagram a web page comprising both, static as well as dynamic content blocks.

FIG. 2a shows a block diagram of a web page 200 comprising both, static as well as dynamic content blocks. The content blocks, in this example, showing the actual content by retrieving data from, e.g., an underlying content management system and converting it into a displayable markup by applying a Handlebar template to the data. The application blocks—i.e., the dynamic content—of the single page application are the blocks that are providing active page elements, like page navigation, dynamic lists (e.g., related products), and the like.

The blocks 202, 206, 208 and 212 are shown as static content blocks. Static content block 202 may, e.g., comprise an image with text, static content blocks 206, 208 may be simple text blocks, while the 4$^{th}$ static content block 212 may show, exemplary, again an image with text. In contrast, the blocks 204 and 210 comprise dynamic content of the web application. Block 204 may, e.g., be the home for navigating the web page, and block 210 may be dynamic output data from an online shop system.

The pre-rendered version of the page shown in FIG. 2b (shown in a different scale than FIG. 2a and without the reference numerals of FIG. 2a) skips all applications—i.e., dynamic content—blocks and only contains the static content blocks 202, 206, 208, 212. This is sufficient for the page in order to obtain good results for a crawler for indexing by a search engine. In case of a browser call, the application blocks are loaded and instantiated by the SPA bootstrapping process that happens after the initial load of the static content blocks, which is skipped by the search crawler.

From then on, the page is fully functional, and the page navigation is fully controlled by the SPA so that additional page loads can be avoided for navigational events as usual. The search crawler in step does not use page navigation events, but the sitemap.XML file of the site in all available pages. The sitemap structure can easily be generated from the data in the content management system. The URLs in the sitemap will trigger the same page loading for each page as described above, such that all pages are indexed correctly.

It may again be noted that the dynamic content blocks 204 and 210 will not be made available to a crawler if it is determined that single page application is requested from a crawler. Thus, only the static content blocks 200, 206, 208 and 212 are pre-rendered on the server and made available to the crawler.

Figure 3:
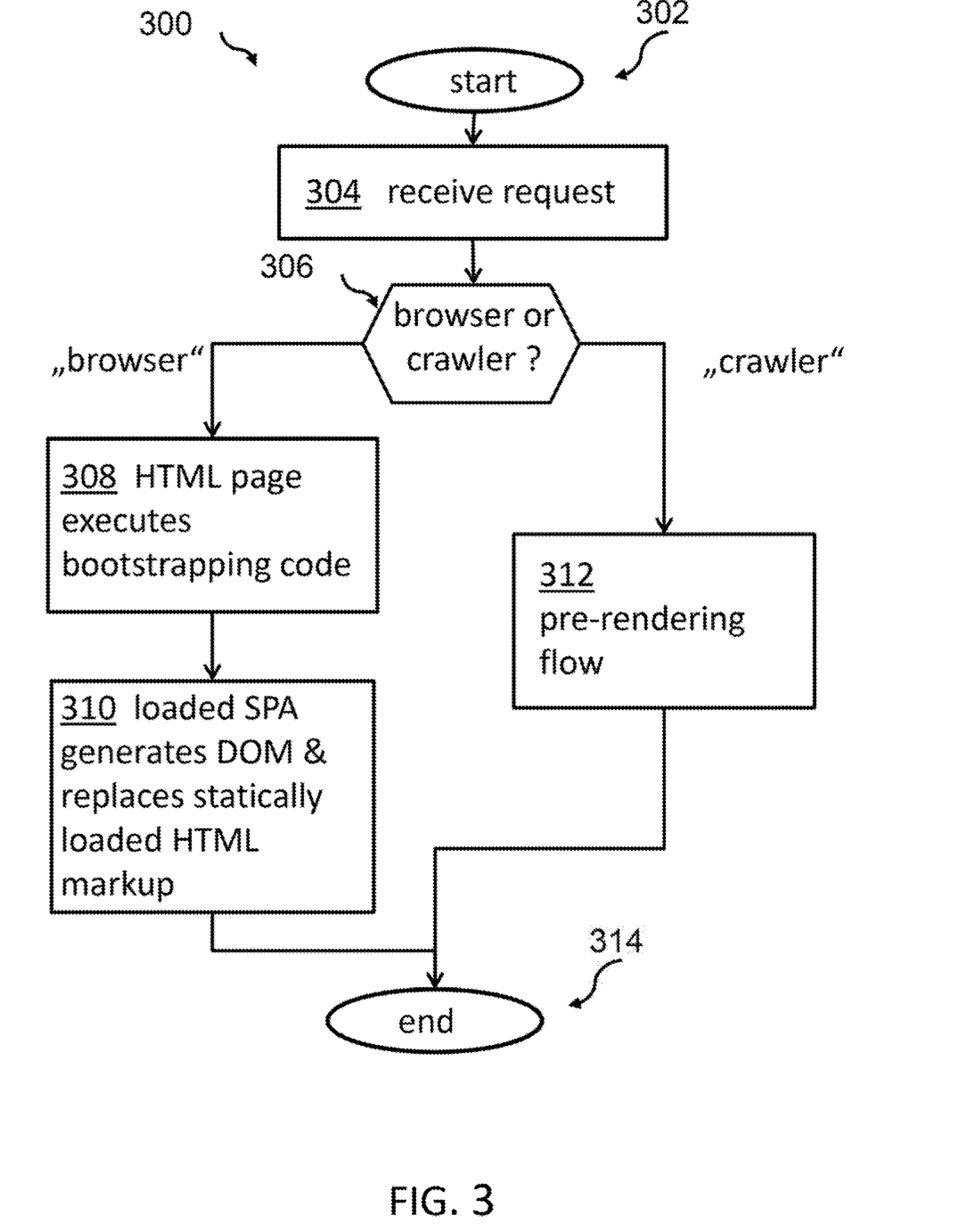
FIG. 3 shows a block diagram of an embodiment of a more implementation-near flowchart of aspects of the proposed method.

FIG. 3 shows a block diagram of an embodiment of a more implementation-near flowchart 300 of aspects of the proposed method. The process starts at 302 with receiving, 304, a request for a single page application via its related address, i.e., the corresponding URL. On the server-side, it is determined, 306, whether the request originates from a client-side browser or a crawler.

If it is determined that the request originates from a client-side browser, the static content blocks are loaded and the related HTML page executes the bootstrapping code and the loaded SPA generates, 310, a DOM and replaces statically loaded HTML markup code.

If it is determined that the request originates from a crawler, the pre-rendering flow (compare FIG. 4) is executed. In both cases, the browser case and the crawler case, the process ends at 314.

Figure 4:
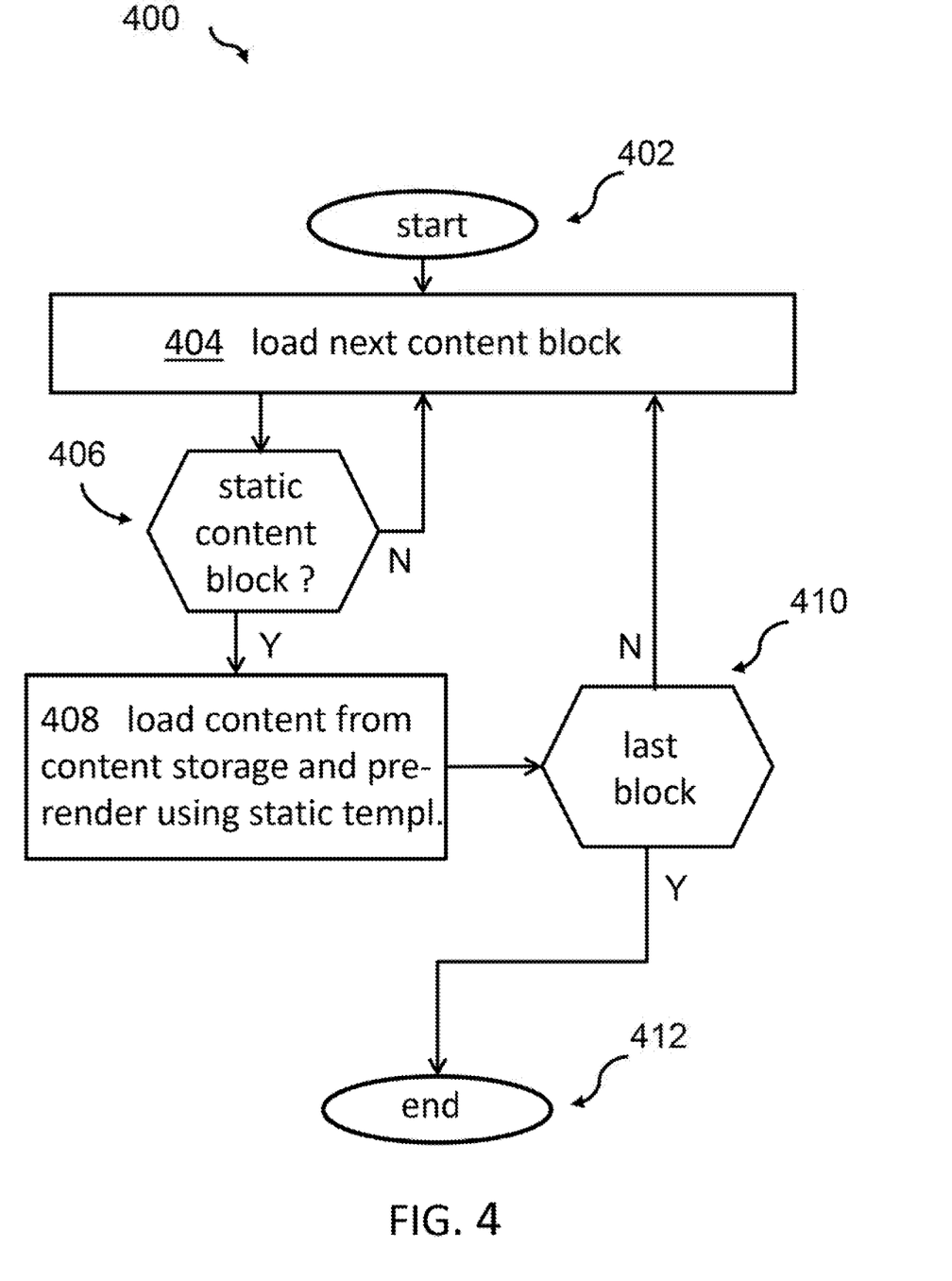
FIG. 4 shows a block diagram of a flowchart the pre-rendering flow on the server.

FIG. 4 shows a block diagram of a flowchart describing the pre-rendering flow 400 on the server. Here, the process starts, 402, with the loading, 404, of the next content block. During the first iteration, the first content block is loaded. Then, it is determined, 406, whether the block is a static content block. If that is not the case, the process returns to loading the next content block, 404. If it is determined that the loaded content block is a static content block, it is loaded, 408, from the content storage and pre-rendered using a static template. Then, it is determined, 410, whether the process has reached the last block of the SPA. If that is not the case—case "N"—the process returns to loading the next content block, 404. If it was the last block of the SPA—case "Y"—the process ends at 412.

Figure 5:
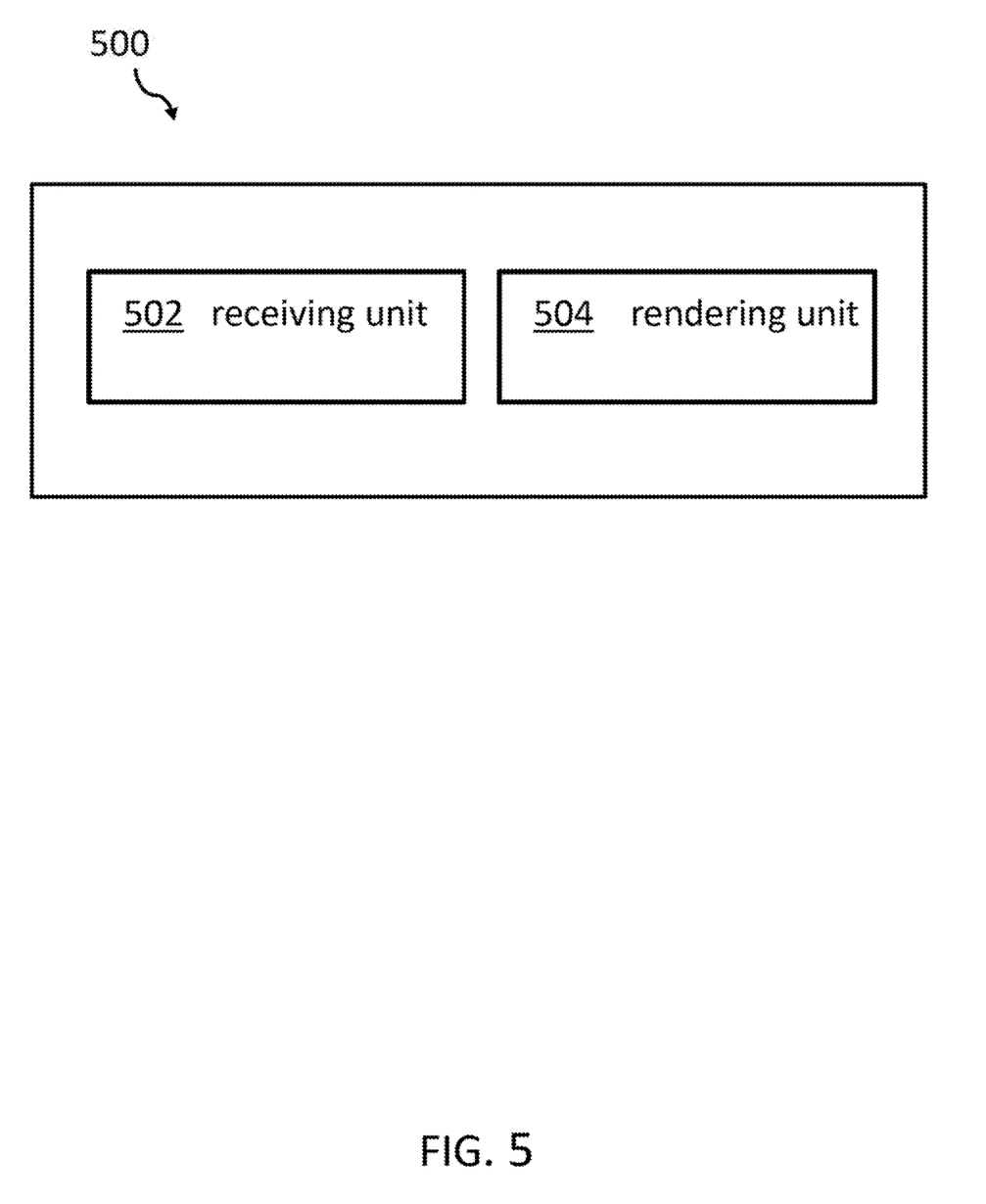
FIG. 5 shows a block diagram of an embodiment of the system for enabling static markup crawlability for a web application dynamically updating web pages client-side.

FIG. 5 shows a block diagram of an embodiment of the system 400 for enabling static markup crawlability for a web application dynamically updating web pages client-side. The system 500 comprising a receiving unit 502 for receiving a request for a web page address and for providing a web application identifiable by a web address comprising both a static content block and dynamic content, and a pre-rendering unit 504 for generating a static HTML page and pre-rendering the static content block of the web application such that at least a portion—for example all, or at least more than half—of all static content of the web application is crawlable.

The pre-rendering unit may be implemented on the server. In a special case, the server may be the same that is used for executing the content management system and/or the management of the single page application.

Figure 6:
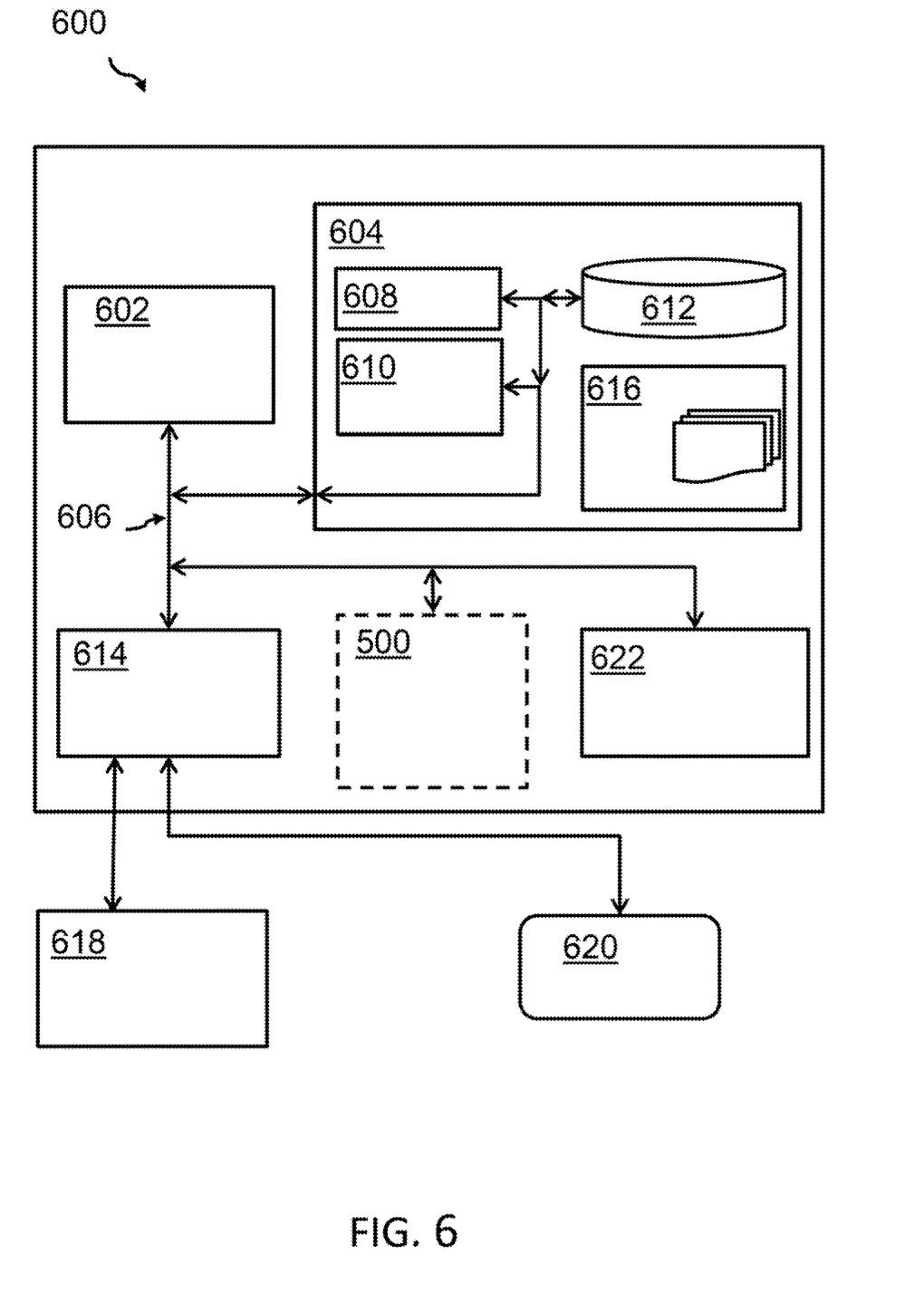
FIG. 6 shows an embodiment of a computing system comprising the system according to FIG. 5.

Embodiments of the invention may be implemented together with a computer, regardless of the platform, being suitable for storing and/or executing program code. FIG. 6 shows, as an example, a computing system 600 suitable for executing program code related to the proposed method.

The computing system 600 is only one example of a suitable computer system, and is not intended to suggest any limitation as to the scope of use or functionality of embodiments of the invention described herein, regardless, whether the computer system 600 is capable of being implemented and/or performing any of the functionality set forth hereinabove. In the computer system 600, there are components, which are operational with numerous other general purpose or special purpose computing system environments or configurations. Examples of well-known computing systems, environments, and/or configurations that may be suitable for use with computer system/server 600 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 600 may be described in the general context of computer system-executable instructions, such as program modules, being executed by a computer system 600. Generally, program modules may include routines, programs, objects, components, logic, data structures, and so on that perform particular tasks or implement particular abstract data types. Computer system/server 600 may be practiced in distributed cloud computing environments where tasks are performed by remote processing devices that are linked through a communications network. In a distributed cloud computing environment, program modules may be located in both, local and remote computer system storage media, including memory storage devices.

As shown in the figure, computer system/server 600 is shown in the form of a general-purpose computing device. The components of computer system/server 600 may include, but are not limited to, one or more processors or processing units 602, a system memory 604, and a bus 606 that couple various system components including system memory 604 to the processor 602. Bus 606 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 600 typically includes a variety of computer system readable media. Such media may be any available media that is accessible by computer system/server 600, and it includes both, volatile and non-volatile media, removable and non-removable media.

The system memory 604 may include computer system readable media in the form of volatile memory, such as random-access memory (RAM) 608 and/or cache memory 610. Computer system/server 600 may further include other removable/non-removable, volatile/non-volatile computer system storage media. By way of example only, a storage system 612 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 606 by one or more data media interfaces. As will be further depicted and described below, memory 604 may include at least one program product having a set (e.g., at least one) of program modules that are configured to carry out the functions of embodiments of the invention.

The program/utility, having a set (at least one) of program modules 616, may be stored in memory 604 by way of example, and not limiting, as well as an operating system, one or more application programs, other program modules, and program data. Each of the operating systems, one or more application programs, other program modules, and program data or some combination thereof, may include an implementation of a networking environment. Program modules 616 generally carry out the functions and/or methodologies of embodiments of the invention, as described herein.

The computer system/server 600 may also communicate with one or more external devices 618 such as a keyboard, a pointing device, a display 620, etc.; one or more devices that enable a user to interact with computer system/server 600; and/or any devices (e.g., network card, modem, etc.) that enable computer system/server 600 to communicate with one or more other computing devices. Such communication can occur via Input/Output (I/O) interfaces 614. Still yet, computer system/server 600 may communicate with one or more networks such as a local area network (LAN), a general wide area network (WAN), and/or a public network (e.g., the Internet) via network adapter 622. As depicted, network adapter 622 may communicate with the other components of the computer system/server 600 via bus 606. It should be understood that, although not shown, other hardware and/or software components could be used in conjunction with computer system/server 600. Examples, include, but are not limited to: microcode, device drivers, redundant processing units, external disk drive arrays, RAID systems, tape drives, and data archival storage systems, etc.

Additionally, the system 500 for enabling static markup crawlability for a web application dynamically updating web pages client-side may be attached to the bus system 606.

The descriptions of the various embodiments of the present invention have been presented for purposes of illustration but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer readable storage medium (or media) having computer readable program instructions thereon for causing a processor to carry out aspects of the present invention.

The medium may be an electronic, magnetic, optical, electromagnetic, infrared or a semi-conductor system for a propagation medium. Examples of a computer-readable medium may include a semi-conductor or solid-state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disk read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, implement the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatuses, or another device to cause a series of operational steps to be performed on the computer, other programmable apparatus or other device to produce a computer implemented process, such that the instructions which execute on the computer, other programmable apparatuses, or another device implement the functions/acts specified in the flowchart and/or block diagram block or blocks.

The flowcharts and/or block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the invention. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated.

What is claimed is:

1. A computer-implemented method for enabling static markup crawlability for a web application dynamically updating web pages client-side, the method comprising:
   providing a web application identifiable by a web address comprising both, a static content block and dynamic content;
   receiving a request for the web address;
   determining whether the request originates from a browser or a crawler;
   in response to determining that the request originates from a crawler, generating a static HTML page and pre-rendering the static content block of the web application from a content storage such that at least a portion of the static content of the web application is crawlable, wherein the pre-rendering further comprises individually determining whether each content block comprises static content or dynamic content, and loading content blocks comprising static content while skipping and suppressing dynamic content blocks; and
   in response to a browser call after initiation of the pre-rendering that follows the request originating from the crawler, loading the static content and executing a bootstrap code pulled in by the static HTML page to load and render the dynamic content after the load of the static content, and then replacing statically loaded HTML markup code.

2. The computer-implemented method according to claim 1, further comprising:
   requesting a first static content block of the web application from the content storage; and
   pre-rendering the content of the first static content block using respective static templates on a server.

3. The computer-implemented method according to claim 1, further comprising:
   in response to determining that more static content blocks are present in the web application, repeating a loading and the pre-rendering for at least a portion of the more static content blocks in the web application.

4. The computer-implemented method according to claim 1, wherein the bootstrap code enables lazy loading and starts rendering of the web application.

5. The computer-implemented method according to claim 1, further comprising:
dynamically generating, by the web application, an HTML document object model relating to the static HTML page.

6. The computer-implemented method according to claim 1, wherein the bootstrap code is JavaScript code.

7. The computer-implemented method according to claim 1, further comprising:
in response to determining a call to the web address is not a browser originating call, suppressing an execution of the bootstrap code.

8. The computer-implemented method according to claim 1, further comprising:
in response to determining a browser call to the web address, sending the static HTML page; and
replacing the static HTML page with the web application.

9. The computer-implemented method according to claim 1, wherein a plurality of dynamic content items are part of a single page application.

10. The computer-implemented method according to claim 1, wherein a plurality of static content blocks represents portions of the web application.

11. The computer-implemented method according to claim 1, wherein the static content block is pre-rendered on the server.

12. A system for enabling static markup crawlability for a web application dynamically updating web pages client-side, the system comprising:
one or more processors, one or more computer-readable memories, one or more computer-readable tangible storage devices, and program instructions stored on at least one of the one or more computer-readable tangible storage devices for execution by at least one of the one or more processors via at least one of the one or more computer-readable memories, wherein the system is capable of performing a method comprising:
providing a web application identifiable by a web address comprising both, a static content block and dynamic content;
receiving a request for the web address;
determining whether the request originates from a browser or a crawler;
in response to determining that the request originates from a crawler, generating a static HTML page and pre-rendering the static content block of the web application such that at least a portion of the static content of the web application is crawlable, wherein the pre-rendering further comprises individually determining whether each content block comprises static content or dynamic content, and loading content blocks comprising static content while skipping and suppressing dynamic content blocks; and
in response to a browser call after initiation of the pre-rendering that follows the request originating from the crawler, loading the static content and executing a bootstrap code pulled in by the static HTML page to load and render the dynamic content after the load of the static content, and then replacing statically loaded HTML markup code.

13. The system according to claim 12, further comprising:
requesting a first static content block of the web application from the content storage; and
pre-rendering the content of the first static content block using respective static templates on a server.

14. The system according to claim 12, further comprising:
determining that more static content blocks are present in the web application, and
triggering repeating a loading and the pre-rendering for at least a portion of the more static content blocks in the web application.

15. The system according to claim 12, wherein the bootstrap code enables lazy loading and starts rendering of the web application.

16. The system according to claim 12, wherein generating the static HTML page further comprises:
dynamically generating, by the web application, an HTML document object model relating to the static HTML page.

17. The system according to claim 12, wherein the bootstrap code is JavaScript code.

18. A computer program product for enabling static markup crawlability for a web application dynamically updating web pages client-side, said computer program product comprising a computer readable storage medium having program instructions embodied therewith, said program instructions being executable by one or more computing systems or controllers to cause said one or more computing systems to:
provide a web application identifiable by a web address comprising both, a static content block and dynamic content;
receive a request for the web address;
determine whether the request originates from a browser or a crawler;
in response to determining that the request originates from a crawler, generate a static HTML page and pre-rendering the static content block of the web application such that at least a portion of the static content of the web application is crawlable, wherein the pre-rendering further comprises individually determining whether each content block comprises static content or dynamic content, and loading content blocks comprising static content while skipping and suppressing dynamic content blocks; and
in response to a browser call after initiation of the pre-rendering that follows the request originating from the crawler, loading the static content and executing a bootstrap code pulled in by the static HTML page to load and render the dynamic content after the load of the static content, and then replacing statically loaded HTML markup code.

\* \* \* \* \*